Feb. 11, 1969  E. HOFFMEISTER ET AL  3,426,429
CHUCK MEANS FOR DENTAL HAND PIECE
Filed March 10, 1966  Sheet 1 of 2

INVENTORS
Erich Hoffmeister
Hans Loge
BY
Michael S. Striker
ATTORNEY

Feb. 11, 1969  E. HOFFMEISTER ET AL  3,426,429
CHUCK MEANS FOR DENTAL HAND PIECE
Filed March 10, 1966  Sheet 2 of 2

INVENTOR.
*Erich Hoffmeister*
*Hans Lipp*

BY

*Richard J. Strauss*
ATTORNEY 3,426,429
CHUCK MEANS FOR DENTAL HAND PIECE
Erich Hoffmeister, Alpenstrasse 30, and Hans Loge, Ranzweg 23, both of Biberach (Riss), Germany
Filed Mar. 10, 1966, Ser. No. 533,285
Claims priority, application Germany, Mar. 23, 1965, K 55,621
U.S. Cl. 32—27    4 Claims
Int. Cl. A61c *1/05;* B23b *31/08*

ABSTRACT OF THE DISCLOSURE

A dental hand piece including an elongated spindle formed by a sleeve rotatable about its axis and a pair of tool guide bushings on opposite ends of the sleeve in which a dental tool guided by the guide bushings of the spindle may be releasably clamped by at least a pair of elongated leaf springs having each end portion held in annular cutouts of the guide bushings and an inwardly curved middle portion adapted to engage the shank of a dental tool for clamping the same.

---

The present invention relates to a dental hand piece with chuck means for holding a dental tool in the axial bore of a rotating spindle which may be driven by a gear drive or pulley means or which may be in the form of a hollow shaft of a gas or liquid driven turbine.

The mounting of dental tools in the rotating spindle of a hand piece is connected with considerable difficulties. On the one hand, the tool has to be easily removable from the spindle and, on the other hand, the tool has to be mounted in the spindle exactly coaxial with the latter to assure smooth working of the tool.

Various attempts have been made to provide chuck means or clamping devices which satisfy the above conditions. Thus, clamping devices chuck means for dental tools are known which comprise a metal sleeve which is provided in a middle portion thereof with longitudinal slots or which has a plurality of slots angularly displaced from each other which extend from opposite ends of the sleeve beyond the middle thereof. The tongues thus obtained between the slots are bent inwardly so as to resiliently press in radial direction against the shank of the tool inserted in the sleeve. The uniform slotting of the sleeve and the bending of the tongues is however extremely difficult, due to the necessary small dimensions of the clamping sleeve, which for instance may have an interior diameter of 1.6 mm. Experience has shown that clamping sleeves of this type lead quite often to an eccentric arrangement of the tool in the drive spindle and to chatter of the tool and thereby to vibration of the dental hand piece. An exact working with the hand piece is then not possible any longer. In addition, the eccentrically rotating tool leads to a one sided loading of the spindle bearings and to rapid wear of the latter.

It has also been suggested to make the clamping sleeves out of resiliently compressible plastic material, however, such clamping sleeves are subjected during extended use to considerable wear so that already after a relatively short time the tools are not properly held any longer in the sleeve.

It has further been suggested to use an elongated leaf spring pressing from one side against the shank of the tool to clamp the latter in the spindle of a hand piece. In such a construction, the elongated spring is clamped at one end in the spindle and presses with its other end, which is provided with an appropriate nose, against a corresponding profile of the tool shank. While this profiling has the advantage that the acting pressure surface is increased and thereby the clamping action improved, this arrangement has the disadvantages that only tools with appropriately profiled shanks can be used. An additional disadvantage of this arrangement is that the spring will provide one sided pressure on the tool shank, which will lead to an eccentric position of the tool in the bore of the drive spindle, which in turn will lead, especially with fast rotating tools, to the above-mentioned disadvantages.

It is an object of the present invention to provide for chuck or clamping means for clamping a dental tool in a spindle of a hand piece which avoids the disadvantages of the clamping devices known in the art.

It is an additional object of the present invention to provide for chuck means in dental hand pieces which will assure an exact clamping of the dental tool coaxial with the drive spindle.

It is a further object of the present invention to provide for such chuck means which not only can be manufactured to very exact tolerances at reasonable costs, but which also stand up properly under extended use.

It is yet another object of the present invention to provide for a dental hand piece having an elongated spindle means formed with an axial bore and chuck means in the axial bore of the elongated spindle means constructed and arranged to provide for an exact clamping of a dental tool in the axial bore of the spindle coaxial therewith.

With these and other objects in view, the dental hand piece according to the present invention mainly comprises elongated spindle means formed with an axial bore and being mounted for rotation about its axis in the hand piece, and chuck means in the axial bore of the elongated spindle means, which chuck means comprise at least two separate, elongated and radially resilient leaf springs mounted uniformly spaced from each other in the elongated spindle means for clamping the shank of a dental tool in the bore between the springs. Such springs which are preferably formed from metal can be manufactured to very exact tolerances in a very simple manner by stamping, pressing and subsequent hardening. The springs may be arranged diametrically opposite to each other or uniformly spaced from each other whereby an exact eccentric clamping of the tool in the bore of the drive spindle will be assured.

Preferably, each of the leaf springs is formed from an elongated meetal strip and has a middle portion curved in direction of its elongation and a pair of end portions wider than the middle portion and extending essentially parallel to the axis of the spindle. The spindle preferably includes an elongated sleeve and a pair of guide bushings coaxial with the sleeve and arranged in opposite end portions of the latter and the end portions of the springs are preferably located in annular cutouts of the guide bushings with edges of the end portions of adjacent springs abutting against each other, whereby the position of the springs relative to each other is fixed, which further improves the coaxial clamping of a tool shank inserted between the springs.

According to a further feature of the present invention, each of the springs has at least in the middle portion thereof in a plane substantially normal to the axis of the spindle preferably a cross section forming part of a circular ring which has preferably an inner diameter substantially equal to the outer diameter of the shank of the dental tool to be clamped between the springs. This construction will not only increase the surface with which each of the springs contacts the tool shank, but also result in an increase of the moment of resistance of the spring against bending about its transverse axis and therewith to increase of the spring pressure for clamping the tool shank.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
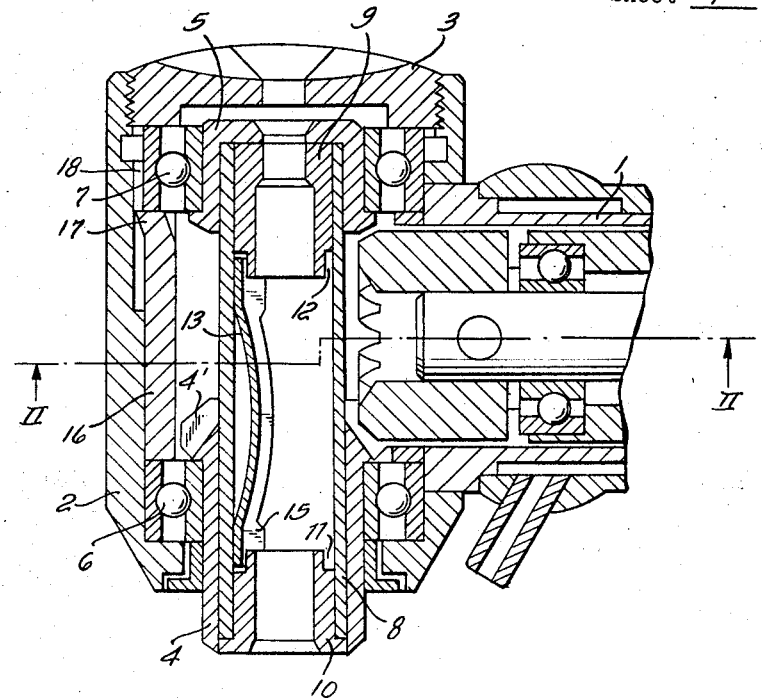
FIG. 1 is a longitudinal cross section taken along the line I—I of FIG. 2 and showing one embodiment of a dental hand piece with chuck means according to the present invention.
Figure 2:
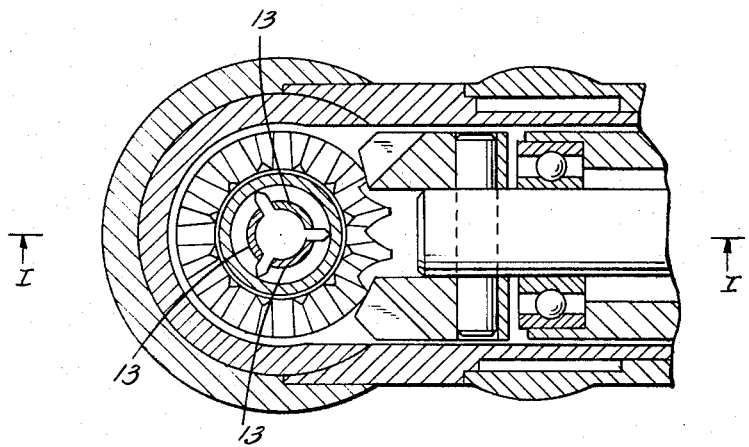
FIG. 2 is a cross section taken along the line II—II of FIG. 1.

Referring now to the drawings, and more specifically to FIGS. 1 and 2 of the same, it will be seen that the dental hand piece according to the present invention comprises a transverse member 1 to the front end of which a head member 2 of a hand piece is attached in any convenient manner. The head member 2 is closed at the upper end by a cover 3 which may be screwed into an appropriately threaded end of the hollow head member. A drive bushing 4 and an opposite bushing 5 are rotatably mounted in the interior of the head member 2 by means of ball bearings 6 and 7. An elongated sleeve 8 is press fitted at one end thereof into the drive bushing 4 and fitted with a slide fit at the other end thereof in the bushing 5. A guide bushing 9 is fitted with a slide fit in one end of the elongated sleeve 8 and another guide bushing 10 is fitted, preferably with a press fit, into the opposite end of the elongated sleeve. The shank of a tool, for instance a dental drill, not shown in FIG. 1, may be inserted in the coaxial bores of the guide bushings 9 and 10. The elongated sleeve 8 and the bushings 4, 5, 9 and 10 form elongated spindle means mounted in the hand piece for rotation about its axis. The arrangement includes further chuck means in the axial bore of the elongated spindle means for coaxially clamping a shank of a dental tool in the bore. The chuck means according to the present invention comprise at least two, or as shown in FIG. 2 three, elongated separate leaf springs 13 arranged about the axis of the bore equally spaced from each other.

Figure 4:
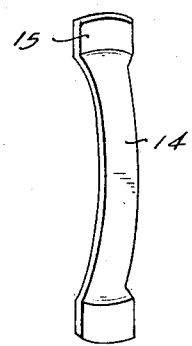
FIG. 4 is a perspective view of a clamping spring according to the present invention.

Each of the leaf springs 13 is preferably, as best shown in FIG. 4, in the form of an elongated strip of elastic material, preferably metal, and has a middle portion 14 curved in direction of elongation of the strip and a pair of end portions 15 wider than the middle portion and extending substantially parallel to the axis of the spindle. As is evidenced from FIG. 2, each of the leaf springs 13 has in a plane substantially normal to the axis of the spindle a cross section forming part of a circular ring, the inner diameter of which is preferably substantially equal to the outer diameter of the tool shank to be inserted between the springs 13. The end portions of the springs are held in annular cutouts 11 and 12 respectively formed at the outer periphery and at the end portions of the guide bushings 9 and 10 which face each other. The cutouts 11 and 12 extend in axial direction into the respective guide bushings to such a depth so as not to impede elongation of the springs 13 during insertion of the shank of the tool between the springs. To show the cutouts 11 and 12 more clearly, only one spring 13 is shown in FIG. 1, but as clearly evidenced from FIG. 2, three springs 13 are provided, the end portions of which abut with adjacent edges thereof against each other so that the relative position of the springs to each other is fixed.

The clamping springs 13 can be exchanged in a very convenient manner by unscrewing the cover 3 from the head member 2 and removing the bushing 5 with the ball bearing 7 and the guide bushing 9 from the sleeve 8. A spacer bushing 16 is preferably arranged between the ball bearings 6 and 7 abutting with opposite ends against end faces of the ball bearings and the spacer bushing 16 is preferably provided at one end thereof with a radially extending nose 17 extending into a corresponding groove 18 in the head member 2 so as to prevent rotation of the spacer bushing 16 about its axis. The drive bushing 4 is provided at its inner end with a bevel gear 4' which may be integrally formed with the drive bushing 4 and the bevel gear 4' meshes with a corresponding gear on the inner end of a drive shaft extending through the transverse member 1.

Figure 3:
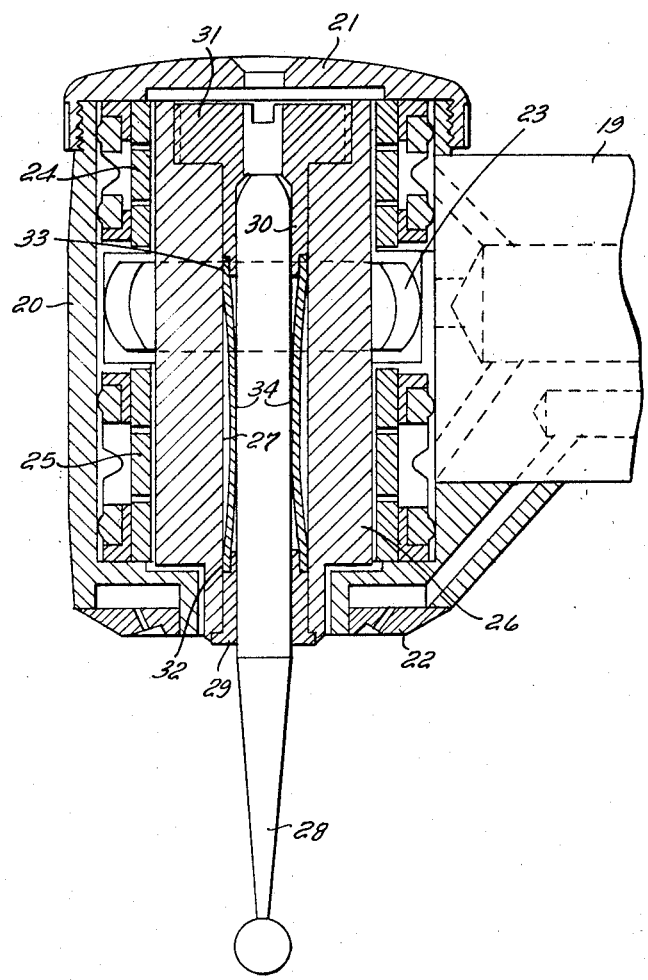
FIG. 3 is a longitudinal cross section showing another embodiment of a hand piece according to the present invention.

The embodiment shown in FIG. 3 is a dental hand piece with a turbine drive. The transverse member 19 of the hand piece carries at one end thereof the head member 20 which is closed at one end by a cover 21 and at the other end thereof by a cover 22. The rotor 23 of the turbine is turnably mounted in the interior of the hollow head member 20 by means of two bearings 24 and 25 which are lubricated by the gas or the liquid driving the turbine and which passes into the interior of the head member 20 through appropriate bores in the transverse member 19. The shaft 26 of the rotor of the turbine is provided with an axial bore 27 which receives the shank of a tool 28, for instance a dental drill. A guide bushing 29 is press fitted into one end of the axial bore 27. The opposite end of the bore 27 is enlarged and provided with an inner screw thread into which the flange 31 of another guide bushing 30 is threadedly engaged. The guide bushings 29 and 30 are formed at the outer peripheries thereof and at the end portions thereof which face each other respectively with annular cutouts 32 and 33 in which the end portions of the clamping springs 34 are located in the manner as described in connection with the embodiment shown in FIGS. 1 and 2. The springs 34 are otherwise constructed and arranged in the cutouts of the guide bushings in the same manner as the springs 13 are arranged in the embodiment shown in FIGS. 1 and 2. The springs 34 may be easily exchanged by removing the cover 21 from the head member 20 and unscrewing the guide bushing 30 from the bore of the shaft 26.

It will be understood that each of the elements described above, or two or more together, may also find a useful application in other types of chuck means for dental hand pieces differing from the types described above.

While the invention has been illustrated and described as embodied in chuck means including at least two separate elongated and radially resilient springs, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a dental hand piece, in combination, elongated spindle means formed with an axial bore and being mounted for rotation about its axis in said hand piece, said spindle means including an elongated sleeve and a pair of guide bushings coaxial with said sleeve and arranged in opposite end portions of the latter with their outer peripheral faces abutting against the inner face of said sleeve, each of said guide bushings having at its end portion facing the end portion of the other guide bushing an annular cutout bounded by said inner face of said elongated sleeve so that said annular cutouts form annular pockets; and chuck means in said axial bore of said elongated spindle, said chuck means comprising at least two separate, elongated radially resilient leaf springs mounted uniformly distributed in circumferential direction in said bore of said elongated spindle means for coaxially clamping a shank of a dental tool in said bore between said springs, each of said springs having an inwardly curved middle portion and a pair of end portions wider than said middle portion and extending substantially parallel to said axis, said end portions projecting into and being located in said annular pockets firmly held therein by the resiliency of said springs.

2. In a dental hand piece as defined in claim 1, wherein said annular cutouts are formed at the outer periphery of said end portions of said guide bushings.

3. In a dental hand piece as defined in claim 1, wherein the end portions of adjacent leaf springs abut with side edges thereof against each other.

4. In a dental hand piece as defined in claim 1, wherein said end portions of said leaf springs are of equal configuration.

References Cited

UNITED STATES PATENTS

| 382,673 | 5/1888 | Williams | 32—26 XR |
|---|---|---|---|
| 514,073 | 2/1894 | Hesse | 32—27 |
| 1,678,097 | 7/1928 | Andresen | 32—27 |
| 2,845,274 | 7/1958 | Peterson | 279—23 |
| 3,092,908 | 6/1963 | Flatland | 32—27 |

FOREIGN PATENTS 1,107,372  5/1961  Germany.

ROBERT PESHOCK, *Primary Examiner.*

U.S. Cl. X.R.

279—23; 253—2